(12) United States Patent
Park (10) Patent No.: US 8,457,667 B2
(45) Date of Patent: Jun. 4, 2013

(54) METHOD FOR MANAGING RADIO RESOURCES ACCORDING TO TYPE OF DATA AND USER EQUIPMENT USING THE SAME

(75) Inventor: Choong-Wan Park, Gyeonggi-Do (KR)

(73) Assignee: KT Corporation, Gyeonggi-do (KR)

( * ) Notice: Subject to any disclaimer, the term of this patent is extended or adjusted under 35 U.S.C. 154(b) by 0 days.

(21) Appl. No.: 13/372,639

(22) Filed: Feb. 14, 2012

(65) Prior Publication Data

US 2012/0208570 A1    Aug. 16, 2012

(30) Foreign Application Priority Data

Feb. 14, 2011 (KR) .......................... 10-2011-0012886

(51) Int. Cl.
*H04W 4/14* (2009.01)
*H04W 52/02* (2009.01)

(52) U.S. Cl.
USPC .......................................... 455/466; 370/311

(58) Field of Classification Search
USPC ................. 455/458, 435.1, 436, 418, 452.1, 455/466, 423, 574, 434.1, 412.1, 411; 370/329, 370/331, 351, 311, 252, 328, 241, 336, 395.5, 370/463, 229, 389
See application file for complete search history.

(56) References Cited

U.S. PATENT DOCUMENTS

| 6,707,809 B1* | 3/2004 | Warrier et al. ................ 370/351 |
| 2007/0117575 A1* | 5/2007 | Courau et al. ................ 455/458 |
| 2008/0253312 A1* | 10/2008 | Park ............................. 370/311 |

* cited by examiner

*Primary Examiner* — Kiet Doan
(74) *Attorney, Agent, or Firm* — IP Legal Services, LLC (57) ABSTRACT

Provided are a method for managing radio resources according to a type of data and user equipment using the same. In the method, a paging message may be received from a radio access network. A cause of the paging message may be determined. A timer may be set for releasing radio resources according to the determined cause of the paging message. When the timer expires, radio resources may be released.

18 Claims, 4 Drawing Sheets

METHOD FOR MANAGING RADIO RESOURCES ACCORDING TO TYPE OF DATA AND USER EQUIPMENT USING THE SAME

CROSS REFERENCE TO PRIOR APPLICATIONS

The present application claims priority under 35 U.S.C. §119 to Korean Patent Application No. 10-2011-0012886 (filed on Feb. 14, 2011), which is hereby incorporated by reference in its entirety.

FIELD OF THE INVENTION

The present invention relates to managing radio resources and, in particular, to managing radio resources according to a type of data in a communication network.

BACKGROUND OF THE INVENTION

Lately, demands for a push data service have abruptly increased as smart-phones have become popular among users of communications devices. The push data service may automatically distribute various types of information to user equipment using push technology. In the push data service, a request for transmission of information may be initiated by a related server, which is coupled with a pull data service where the request for the transmission of information is initiated by a receiver or a client. Such push data service may provide information such as advertisements, news articles, and e-mails in a form of a push message.

A radio connection may be established between user equipment and a communication network when data traffic is generated to be transmitted or received. In order to efficiently utilized limited radio resources in a communication network, such a radio connection may be managed based on a radio resource control (RRC) protocol. For example, a RRC connection between user equipment and a radio network controller may be established when data traffic is generated between the user equipment and the radio network controller. The RRC connection may be released when data traffic is not generated for a given time period.

In general, push data may not necessarily require user equipment to transmit another data in response to the push data. For example, when user equipment receives an advertisement as the push data, the user equipment is not required to transmit a response message when it receives such push data. That is, a RRC connection between the user equipment and a communication network is not necessarily maintained after receiving the push data. If the RRC connection is released when a given time period passes after the push data is received, related radio resources may be wasted.

SUMMARY OF THE INVENTION

Embodiments of the present invention overcome the above disadvantages and other disadvantages not described above. Also, the present invention is not required to overcome the disadvantages described above, and an embodiment of the present invention may not overcome any of the problems described above.

In accordance with an aspect of the present invention, radio resources may be managed according to a type of data associated with user equipment.

In accordance with another aspect of the present invention, radio resources may be released immediately after receiving a push data.

In accordance with another aspect of the present invention, a timer for a transmitting a signal connection release indication (SCRI) message may be set differently according to a type of data received at user equipment. When the tinier expires, a SCRI message is transmitted.

In accordance with an exemplary embodiment of the present invention, a method is provided for managing radio resources according to a type of data. The method may include receiving a paging message, determining a cause for the paging message, setting a period of a timer for releasing radio resources according to the determined cause of the paging message, and releasing the radio resources when the timer expires.

The method may include receiving the paging message when user equipment is in an idle mode, transitioning, by the user equipment, from the idle mode to a connected mode after receiving the paging message, and establishing a radio connection to a radio communication network when the user equipment transitions from the idle mode to a connected mode. The determined cause of the paging message may be based on a paging cause included in the paging message.

The paging cause may include at least one of terminating conversation call, terminating streaming call, terminating interactive call, terminating background call, terminating, high priority signaling, and terminating-cause unknown.

The determining a cause of the paging message may include examining a paging cause included in the paging message, and determining that the paging message relates to a push data when the cause of the paging message is terminating interactive call.

The setting the period of the timer may includes setting the timer with a comparatively short time period when the paging message relates to the push data.

For setting the period of the timer, the timer may be a signal connection release indication (SCRI) timer.

The releasing radio resources may include transmitting a SCRI message to a radio access network, and releasing radio resources allocated when establishing a radio connection from user equipment to a radio communication network in response to the SCRI message.

The radio connection may be at least one of a radio resource control (RRC) connection, a radio bearer, and a radio access bearer (RAE) connection.

After the determining the cause of the paging message, the method may further include transitioning from an idle mode to a connected mode by establishing a radio connection to a radio communication network, transmitting a paging response message through the radio connection in response to the paging message, releasing the radio connection by the releasing radio resources when the timer expires, and transitioning from the connected mode to the idle mode.

In accordance with another embodiment of the present invention, a method may be provided for managing radio resources for a push data. The method may include receiving a paging message when user equipment is in an idle mode, establishing a radio connection from the user equipment and a radio communication network, transmitting a paging response message to the radio communication network through the established radio connection, determining whether a cause of the received paging message is the push data, setting a signal connection release indication (SCRI) timer based on the determination result, and releasing the radio connection when the SCRI timer expires.

The radio connection may be a radio resource control (RRC) connection between the user equipment and a radio network controller. The cause of the received paging message may be based on a paging cause included in the paging message.

The cause of the received paging message may include at least one of terminating conversation call, terminating streaming call, terminating interactive call, terminating background call, terminating high priority signaling, and terminating-cause unknown. Such cause of the received paging message may be determined as a push data when the cause of the received paging message is the terminating interactive call.

The releasing the radio connection may include transmitting a SCRI message to a radio network controller when the timer expires, releasing a radio resource control (RRC) connection to the radio network controller in response to the SCRI message, and transitioning from the connected mode to an idle mode.

In accordance with another embodiment of the present invention, user equipment is provided for managing radio resources according to a type of data. The user equipment may be configured to receive a paging message from a radio access network, determine a cause of the received paging message, set a period of a timer for releasing radio resources according to the determined cause of the paging message, and release the radio resources when the timer expires.

The user equipment may receive the paging message when the user equipment is in an idle mode, transition from the idle mode to a connected mode by establishing a radio resource control (RRC) connection to a radio network controller, and transmit a paging response message to the radio network controller through the radio connection.

The user equipment may determine the cause of the received paging message based on a paging cause included in the received paging message.

The user equipment may set the period of the timer with a comparatively short time period when the paging message is caused by the push data, transmit a signal connection release indication (SCRI) message to the radio access network, release a radio resource control (RRC) connection to a radio network controller when the timer expires; and transition from a connected mode to an idle mode.

BRIEF DESCRIPTION OF THE DRAWINGS

The above and/or other aspects of the present invention will become apparent and more readily appreciated from the following description of embodiments, taken in conjunction with the accompanying drawings, of which.

DETAILED DESCRIPTION OF THE INVENTION

Reference will now be made in detail to embodiments of the present invention, examples of which are illustrated in the accompanying drawings, wherein like reference numerals refer to like elements throughout. The embodiments are described below, in order to explain the present invention by referring to the figures.

For convenience and ease of understanding, a method for managing radio resources according to a type of data in accordance with an exemplary embodiment of the present invention will be described as managing radio resources in a $3^{rd}$ generation partnership project universal mobile telecommunication system (3GPP UMTS) network. The present invention, however, is not limited thereto. For example, a system may manage radio resources in a global system for mobile communication (GSM) or through a tong term evolution (LTE) advanced network in accordance with other embodiments.

Figure 1:
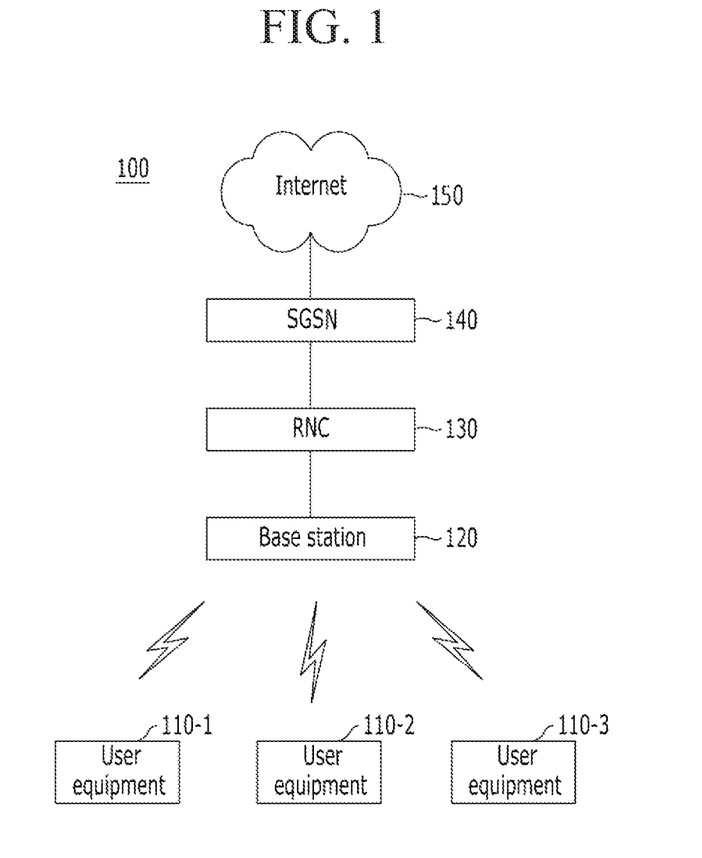
FIG. 1 illustrates a radio communication network employing one or more exemplary embodiments of the present invention.

FIG. 1 illustrates a radio communication network employing one or more exemplary embodiments of the present invention.

Referring to FIG. 1, communication network 100 may include several user equipment 110-1 to 110-3, base station 120, radio network controller (RNC) 130, serving general packet radio service (GPRS) support node (i.e., "SGSN") 1140, and Internet 150.

One or more of user equipment 110-1, 110-2, and 110-3 may be connected to Internet 150 through a radio communication network including base station 120, RNC 130, and SGSN 140. Each of user equipment 110-1, 110-2, and 110-3 may receive data from and/or transmit data to entities on Internet 150 through the radio communication network. In order to transfer data, each of user equipment 110-1 to 110-3 may establish a corresponding radio connection to SGSN 140. For example, radio connections may include a radio resource control (RRC) connection and a radio access bearer (RAB) connection. The RRC connection may be formed between one or more of user equipment 110-1 to 110-3 and RNC 130, and the RAB connection may be formed between RNC 130 and SGSN 140.

Base station 120 may be directly connected user equipment 110-1 to 110-3 and transfer data between each of user equipment 110-1 to 110-3 and RNC 130. For example, base station 120 may receive a radio signal from one of user equipment 110-1 to 110-3, convert the radio signal to a baseband signal, and transmit the baseband signal to RNC 130. Furthermore, base station 120 may receive a baseband signal from RNC 130, convert the baseband signal to a radio signal, and transmit the radio signal to one (or more, if a broadcast) of user equipment 110-1 to 110-3.

RNC 130 may be connected to base station 120 and manage radio resources. RNC 130 may be a service access point connected to a core network. For example, RNC 130 may perform allocation, modification, and release of radio resources in a radio communication network. Furthermore, RNC 130 may perform mobility management of user equipment 110-1 to 110-3. For example, RNC 130 may manage mobility of user equipment 110-1 to 110-3 based on a RRC mode of a RRC protocol. For example, RNC 130 may manage each RRC connection to user equipment 110-1 to 110-3. The RRP mode may include a connected mode and an idle mode. RNC 130 may form a radio access network with base station 120.

SGSN 140 may be a support node of a core network. SGSC 140 may perform a role as a packet switching device in a core network. SGSC 140 may perform packet routing, packet transmission, and mobility management such as an attach/detach process and local management, logical link management and authentication for user equipment 110-1, 110-2, and 110-3.

As described above, the radio connections may be established between user equipment 110-1 to 110-3 and SGSN 140 for receiving data from and/or transmitting data to entities on Internet 150. Since radio resources are limited in a communication network, such radio connections may be released when no data requires transfer. In order to efficiently manage the radio connections, a RRC protocol may be employed. The RRC protocol may include a connected mode and an idle mode. The radio connections may be managed according to the modes of the RRC protocol. Hereinafter, the connected mode and the idle mode and transitions between thereof will be described with reference to FIG. 2.

Figure 2:
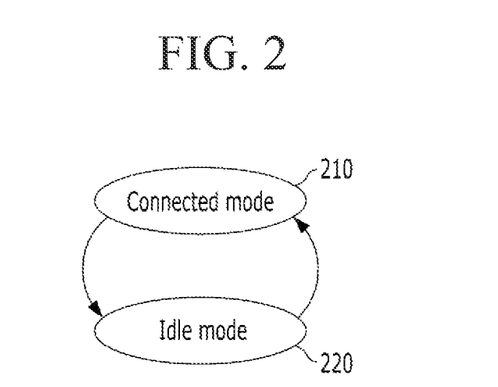
FIG. 2 illustrates RRC mode and mode transitions as might be employed with embodiments of the present invention.

FIG. 2 illustrates RRC mode and mode transitions.

Referring to FIG. 2, a RRC protocol may define two modes: connected mode 210 and idle mode 200. In idle mode 200, user equipment may be powered off or a RRC connection between the user equipment and a radio access network may not be established. In contrast, user equipment may be connected to a radio access network when in connected mode 210. For example, a RRC connection may be established between the user equipment and the radio access network when in connected mode 210. In connected mode 210, a RRC connection may be managed according to RRC states. The RRC states may include a dedicated channel (Dell) state, a forward access channel (FACH) state, and a paging channel (PCH) state. For example, a dedicated channel may be allocated in the DCH state, and a shared channel may be allocated in the FACH state. Furthermore, a paging channel may be allocated in the PCH state.

Idle mode 200 may transition to connected mode 210 by establishing a RRC connection between user equipment and a radio access network. In contrast, connected mode 210 may transition to idle mode 200 by releasing a RRC connection between user equipment and a radio access network.

In order to efficiently manage limited radio resources, radio connections between user equipment and a radio communication network may be released when no data requires transfer. In order to release such radio connections, a signal connection release indication (SCRI) message may be transmitted to RNC 130 when a given time period passes. In response to the SCRI message, RNC 130 may release radio connections to user equipment 110 and SGSN 140. Hereinafter, a typical method for managing radio resources when downlink data is generated will be described with reference to FIG. 3.

Figure 3:
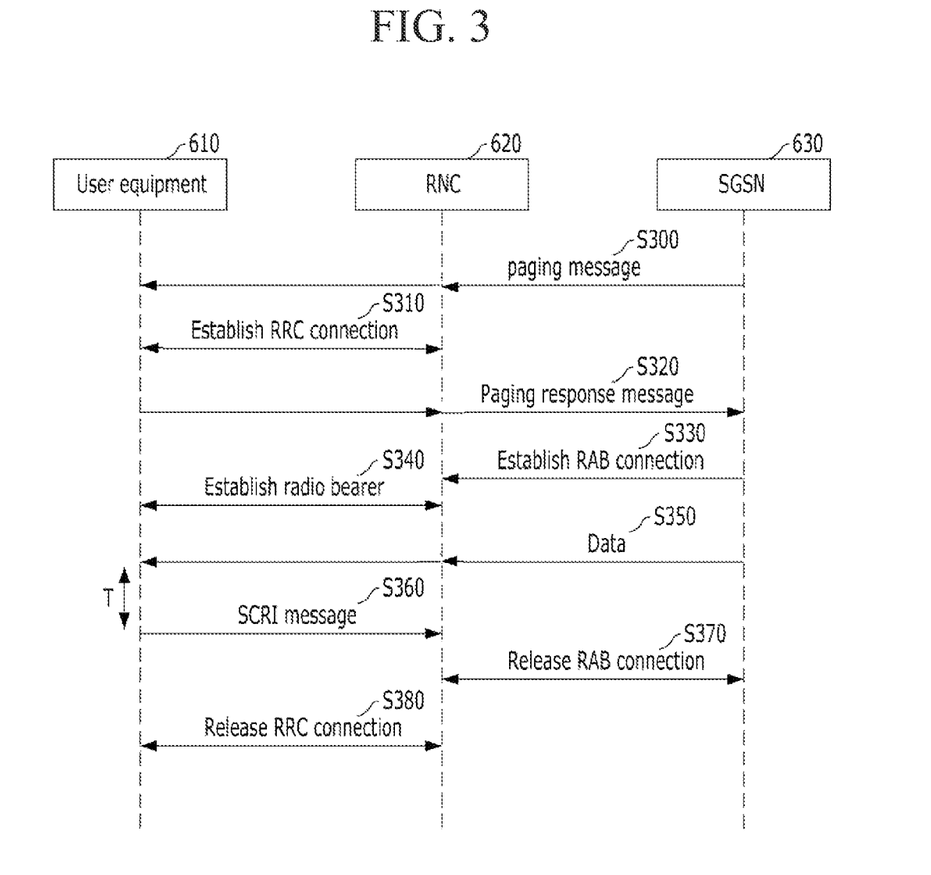
FIG. 3 illustrates a typical method for managing radio resources when data is transmitted to user equipment in an idle mode.

FIG. 3 illustrates a typical method for managing radio resources when data is transmitted to user equipment in an idle mode.

Referring to FIG. 3, when SGSN 630 has data to be transmitted to user equipment 610 in an idle mode, SGSN 630 may transmit a paging message to user equipment 610 through RNC 620 at step S300. In response to the paging message, a RRC connection may be established between user equipment 610 and RNC 620 at step S310. The idle mode may transition to a connected mode by establishing the RRC connection between user equipment 610 and RNC 620.

After establishing the RRC connection, user equipment 610 may transmit a paging response message to SGSC 630 through RNC 620 at step S320. In response to the paging response message, a radio access bearer (RAB) connection may be established between RNC 620 and SGSN 630 at step S330 and a radio bearer may be established between RNC 620 and user equipment 610 at step S340. After establishing the radio bearer, user equipment 610 may receive data from SGSN 630 through the established connections at step S350.

When a given time period, T, expires after receiving the data, user equipment 610 may transmit a signal connection release indication (SCRI) message to RNC 620 in order to release the established connections at step S360. The given time period, T, may be, for example, from about few seconds to several tens of seconds.

In response to the SCRI message, RNC 620 may release the RAB connection between RNC 620 and SGSN 630 at step S370 and release the RRC connection between RNC 620 and user equipment 610 at step S380. User equipment 610 may then transition from the connected mode to the idle mode.

As illustrated in FIG. 3, user equipment 610 transmits the SCRI message regardless of a type of the received data when the given time period passes after receiving the data. Accordingly, the RRC connection may not be released until the given time period passes although it is not necessary to maintain the RRC connection. For example, in general, a push data type of data does not necessarily require user equipment 610 to transmit data in response to the push data. When user equipment 610 receives a push data, such as an advertisement, data is not present for transmission in response to the push data. In this case, if the RRC connection is maintained until the given time period passes, related radio resources will be unnecessarily wasted. Accordingly, there is a need for developing a method for managing radio resources when the received data is push data.

In accordance with an exemplary embodiment of the present invention, radio resources may be managed according to a type of data transmitted to user equipment. For example, when the type of data transmitted to the user equipment is a push data, a radio connection between user equipment and a core network may be immediately released after the user equipment receives the push data. To immediately release such a connection, a timer for transmitting a SCRI message may be set with a comparatively short time in accordance with an exemplary embodiment of the present invention. Hereinafter, a method for managing radio resources according to a type of data and user equipment using the same will be described with reference to FIG. 4 and FIG. 5.

Figure 4:
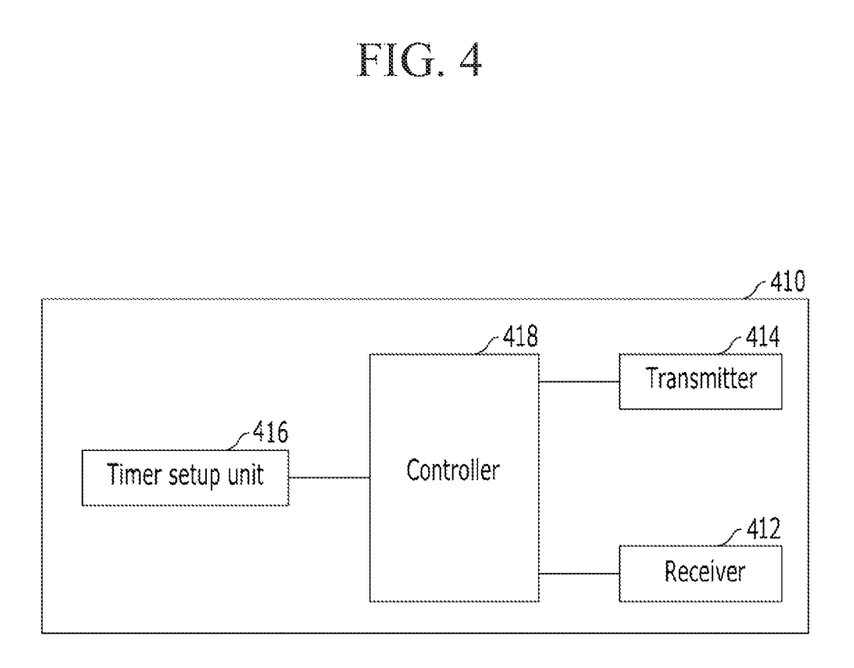
FIG. 4 illustrates user equipment for managing radio resources according to a type of data in accordance with an exemplary embodiment of the present invention.

FIG. 4 illustrates user equipment for managing radio resources according to a type of data in accordance with an exemplary embodiment of the present invention.

When a radio access network has data to be transmitted to user equipment 410 in an idle mode, the radio access network may transmit a paging message to user equipment 410 in order to wake up user equipment 410 from the idle mode and transition to a connected mode. In accordance with an exemplary embodiment of the present invention, user equipment 400 may determine a type of data based on a paging cause (an identified event) included in the paging message and set a timer for releasing radio resources based on the determination result.

Referring to FIG. 4, user equipment 410 may include receiver 412, transmitter 414, timer setup unit 416 and controller 418.

Receiver 412 may receive a paging message from a radio access network when user equipment 410 is in an idle mode. After receiving the paging message, receiver 412 may transfer the paging message to timer setup unit 416. Receiver 412 may receive data after a RRC connection is established to a radio access network.

Timer setup unit 416 may receive the paging message from receiver 412. Timer setup unit 416 may determine a type of data to be received based on the paging message. Particularly, timer setup unit 416 may extract a paging cause included in the paging message and determine whether the paging message is caused by a push message or not.

The paging message may be caused by various events. Table 1 shows paging causes defined in a 3rd generation partnership project (3GPP) specification.

TABLE 1

| Information Element/ Group Name | Type and reference |
|---|---|
| paging cause (event) | Enumerated (Terminating Conversation call, Terminating Streaming Call, Terminating Interactive Call, Terminating Background Call, Terminating High Priority Signaling, Termination Low Priority Signaling, Terminating-cause unknown) |

As shown in Table 1, paging causes may include Terminating Conversation call, Terminating Streaming Call, Terminating Interactive Call, Terminating Background Call, Terminating High Priority Signaling, Termination Low Priority Signaling, and Terminating-cause unknown. When the paging cause is "Terminating Interactive Call," user equipment 410 may determine that the paging message is caused by a push data. That is, user equipment 410 receives the paging message to receive the push data.

Timer setup unit 416 may set up a timer based on the determination result. For example, the timer may be a signal connection release indication (SCRI) timer for transmitting a SCRI message. Timer setup unit 416 may set up the SCRI timer with a comparatively short time when the paging message is caused by the push data. Timer setup unit 416 may set up the SCRI timer with a comparatively long time when the paging message is caused by other events.

Transmitter 414 may transmit data to the radio access network. In accordance with an exemplary embodiment of the present invention, transmitter 414 may transmit a paging response message in response to the paging message and a SCRI message to the radio access network. Controller 1118 may control overall operation of user equipment 110.

Hereinafter, a method for managing radio resources according to a type of data in accordance with an exemplary embodiment of the present invention will be described with reference to FIG. 5.

Figure 5:
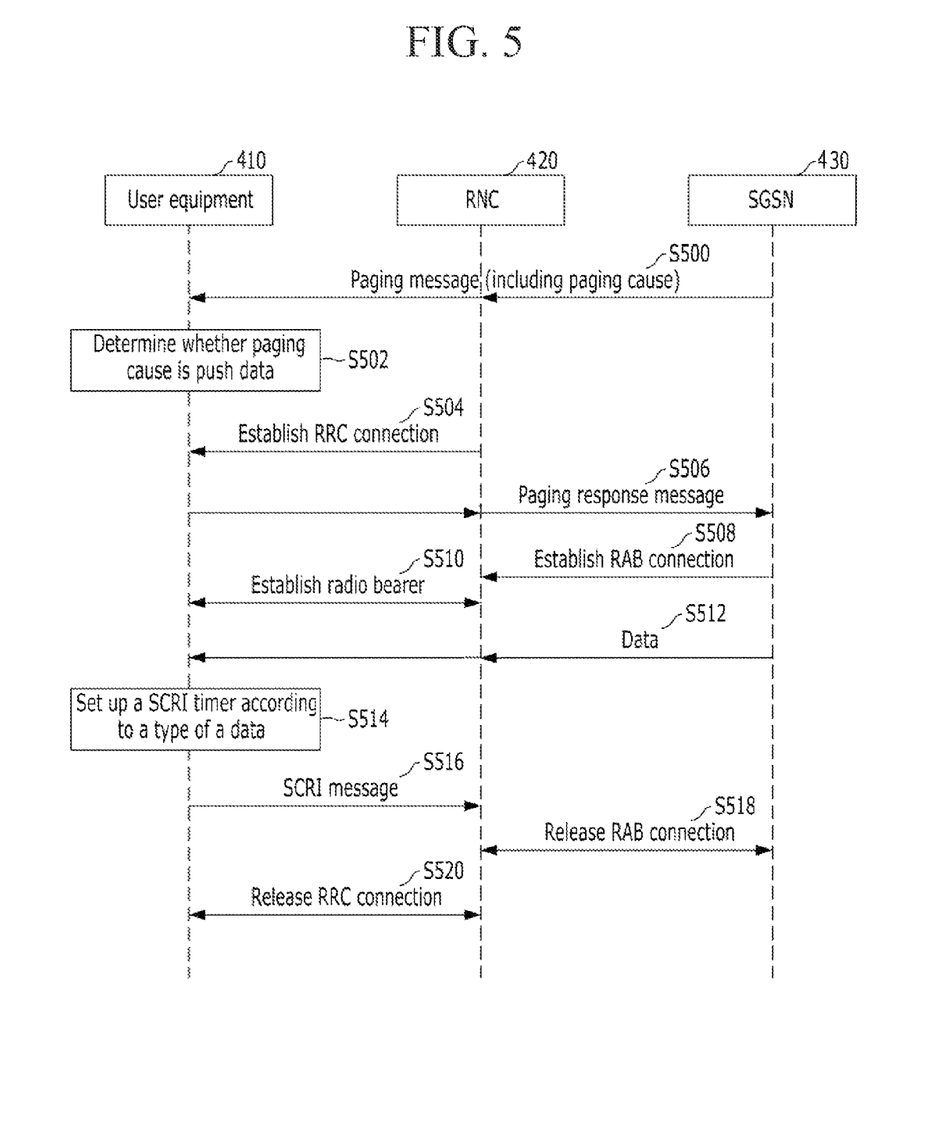
FIG. 5 illustrates a method for managing radio resources according to a type of data in accordance with an exemplary embodiment of the present invention.

FIG. 5 illustrates a method for managing radio resources according to a type of data in accordance with an exemplary embodiment of the present invention.

Referring to FIG. 5, when SGSN 430 has data to be transmitted to user equipment 410 in an idle mode, SGSN 430 may transmit a paging message to user equipment 410 at step S500. For example, the paging message may wake up user equipment 410 from the idle mode and transition to a connected mode.

Upon receipt of the paging message, user equipment 410 may determine a paging cause of the paging message at step S502. By determining the paging cause, user equipment 410 may determine a type of the data to be transmitted from SGSN 430. For example, timer setup unit 416 of user equipment 410 may determine whether the paging message is caused by a push data based on the paging cause included in the paging message. The present invention, however, is not limited thereto. Such determination may be made after transmitting a paging response message to SGSN 430.

In response to the paging message, a RRC connection may be established between user equipment 410 and RNC 430 at step S504, and a paging response message transmitted to SGSN 430 through the RRC connection at step S506.

Upon the receipt of the paging response message, a RAB connection may be established between SGSN 430 and RNC 430 at step S508, and a radio bearer may be established between RNC 430 and user equipment 410 at step S510. User equipment 410 may receive the data from SGSN 430 through the RAB connection and the RRC connection at step 12

At step S514, user equipment 410 may set a timer based on the determination result of step S502. That is, a period length of the timer may be set according to a type of data transmitted from SGSN 430. For example, when the type of data is a push data, user equipment 410 may set the timer with a comparatively short time period in order to quickly release radio resources allocated when establishing the RRC connection and the RAB connection after receiving the push data. On the contrary when the type of data is not a push data, user equipment 410 may set the timer with a comparatively long time period in order to enable user equipment 410 to transmit data in response to the received data. When the type of data is not a push data, transmission of data to SGSN 430 in response to the received data occurs with relatively high probability.

The timer may initiate release of the radio resources occupied allocated when establishing the RRC connection and the RAB connection. For example, the timer may be a. SCRI timer that may initiate transmission of a SCRI message to RNC 420. The present invention, however, is not limited thereto. The timer may initiate one or more other signals or messages to invoke the RRC connection release procedure.

When user equipment 410 does not have data to be transmitted in the period until the timer expires after receiving the data, a radio resource release message may be transmitted to RNC 430 at step S516. For example, the radio resource release message may be a SCRI message. In response to the radio resource release message, RNC 430 may release the RAB connection to SGSN 430 at step S518 and release the RRC connection to user equipment 410 at step S520.

As described above, user equipment 410 may determine whether the received data is a push data or not based on the paging cause included in the paging message in accordance with an exemplary embodiment of the present invention. When the received data is the push data, user equipment 410 may set up the timer with a comparatively short time. User equipment 410 may quickly release the radio resources occupied for the RRC connection and the RAB connection right after receiving the push data. Accordingly, radio resources may be further efficiently utilized because the radio resources are quickly released when the received data does not require user equipment 410 to transmit data in response to the received data.

Particularly, when the connected mode is controlled by RRC states such as a CELL_DCH state, a CELL_FACH state, and a CELL_PCH state, the connected mode may not directly transition to the idle mode by transmitting the SCRI message in accordance with an exemplary embodiment of the present invention. For example, the CELL_DCH state is generally unable transition to the idle mode without passing through the CELL_FACH state and/or the CELL_PCH state. The CELL_DCH state may transit to the CELL_FACH state when data traffic is not generated in the CELL_DCH state for a given, predetermined period of time. The CELL_FACH state may transition to the CELL_PCH state when data traffic is not generated for a given time in the CELL_FACH state. The CELL_PCH state may transition to the idle mode when data traffic is not generated for a given, predetermined period of time in the CELL_PCH state. In accordance with an exemplary embodiment of the present invention, the connected mode may directly transition to the idle mode immediately after receiving a push data by transmitting a SCRI message to RNC 430. Therefore, efficiency in utilizing radio resources may be maximized in accordance with an exemplary, embodiment of the present invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

No claim element herein is to be construed under the provisions of 35 U.S.C. §112, sixth paragraph, unless the element is expressly recited using the phrase "means for" or "step for."

Although embodiments of the present invention have been described herein, it should be understood that the foregoing embodiments and advantages are merely examples and are not to be construed as limiting the present invention or the scope of the claims. Numerous other modifications and embodiments can be devised by those skilled in the art that will fall within the spirit and scope of the principles of this disclosure, and the present teaching can also be readily applied to other types of apparatuses. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method for managing radio resources according to a type of data, the method comprising:
   receiving a paging message;
   determining a cause for the paging message;
   variably setting a period of a timer for releasing radio resources according to the determined cause of the paging message, wherein the timer is set to have a comparatively short time period when the cause of the paging message is determined as a push data; and
   releasing the radio resources when the timer expires,
   wherein the releasing the radio connection includes: transmitting a Signal Connection Release Indication (SCRI) message to a radio network controller when the timer expires; releasing a radio resource control (RRC) connection to the radio network controller in response to the SCRI message; and
   transitioning from the connected mode to an idle mode.

2. The method of claim 1, comprising:
   receiving the paging message when user equipment is in an idle mode;
   transitioning, by the user equipment, from the idle mode to a connected mode after receiving the paging message; and
   establishing a radio connection to a radio communication network when the user equipment transitions from the idle mode to a connected mode.

3. The method of claim 1, wherein the determined cause of the paging message is based on a paging cause included in the paging message.

4. The method of claim 3, wherein the paging cause includes at least one of terminating conversation call, terminating streaming call, terminating interactive call, terminating background call, terminating high priority signaling, and terminating-cause unknown.

5. The method of claim 1, wherein the determining a cause of the paging message includes:
examining a paging cause included in the paging message; and
determining that the paging message relates to the push data when the cause of the paging message is terminating interactive call.

6. The method of claim 1, wherein the determining and the setting the period of the timer
are performed by user equipment.

7. The method of claim 1, wherein, for setting the period of the timer, the timer is a signal connection release indication (SCRI) timer.

8. The method of claim 7, wherein the releasing radio resources includes:
transmitting a SCRI message to a radio access network; and
releasing radio resources allocated when establishing a radio connection from user equipment to a radio communication network in response to the SCRI message.

9. The method of claim 8, wherein the radio connection is at least one of a radio resource control (RRC) connection, a radio bearer, and a radio access bearer (RAB) connection.

10. The method of claim 1, wherein, after the determining the cause of the paging message, further comprising:
transitioning from an idle mode to a connected mode by establishing a radio connection to a radio communication network;
transmitting a paging response message through the radio connection in response to the paging message;
releasing the radio connection by the releasing radio resources when the timer expires; and
transitioning from the connected mode to the idle mode.

11. A method for managing radio resources for a push data, the method comprising:
receiving a paging message when user equipment is in an idle mode;
establishing a radio connection from the user equipment and a radio communication network;
transmitting a paging response message to the radio communication network through the established radio connection;
determining whether a cause of the received paging message is the push data;
variably setting a signal connection release indication (SCRI) timer based on the determination result, wherein the SCRI timer is set to have a comparatively short time period when the cause of the received paging message is determined as the push data; and
releasing the radio connection when the SCRI timer expires,
wherein the releasing the radio connection includes: transmitting a Signal Connection Release Indication (SCRI) message to a radio network controller when the timer expires; releasing a radio resource control (RRC) connection to the radio network controller in response to the SCRI message; and
transitioning from the connected mode to an idle mode.

12. The method of claim 11, wherein:
the radio connection is a radio resource control (RRC) connection between the user equipment and a radio network controller; and
the determining and the setting are performed by the user equipment.

13. The method of claim 11, wherein the cause of the received paging message is based on a paging cause included in the paging message.

14. The method of claim 13, wherein:
the cause of the received paging message includes at least one of terminating conversation call, terminating streaming call, terminating interactive call, terminating background call, terminating high priority signaling, and terminating-cause unknown; and
the cause of the received paging message is determined as the push data when the cause of the received paging message is the terminating interactive call.

15. User equipment for managing radio resources according to a type of data, the user equipment configured to:
receive a paging message from a radio access network;
determine a cause of the received paging message;
variably set a period of a timer for releasing radio resources according to the determined cause of the paging message, wherein the timer is set to have a comparatively short time period when the cause of the received paging message is determined as a push data; and
release the radio resources when the timer expires,
wherein the releasing the radio connection includes: transmitting a Signal Connection Release Indication (SCRI) message to a radio network controller when the timer expires; releasing a radio resource control (RRC) connection to the radio network controller in response to the SCRI message; and
transitioning from the connected mode to an idle mode.

16. The user equipment of claim 15, wherein the user equipment receives the paging message when the user equipment is in an idle mode, transitions from the idle mode to a connected mode by establishing a radio resource control (RRC) connection to a radio network controller, and transmits a paging response message to the radio network controller through the radio connection.

17. The user equipment of claim 15, wherein the user equipment determines the cause of the received paging message based on a paging cause included in the received paging message.

18. The user equipment of claim 17, wherein:
the paging cause includes at least one of terminating conversation call, terminating streaming call, terminating interactive call, terminating background call, terminating high priority signaling, and terminating-cause unknown; and
the user equipment determines that the paging message is caused by the push data when the cause of the paging message is terminating interactive call.

* * * * *